US005571587A

United States Patent [19]

Bishop et al.

[11] Patent Number: 5,571,587

[45] Date of Patent: Nov. 5, 1996

[54] SHEETSTOCK ADAPTED FOR USE WITH LASER AND INK JET PRINTERS

[75] Inventors: Willis E. Bishop, Diamond Bar; Dennis L. Greaver, Rialto; Jane M. Thompson, Pasadena, all of Calif.

[73] Assignee: Avery Dennison, Pasadena, Calif.

[21] Appl. No.: 274,772

[22] Filed: Jul. 14, 1994

[51] Int. Cl.$^6$ .......... B32B 3/02

[52] U.S. Cl. .......... 428/43; 283/105; 428/77; 428/78; 428/79; 428/81; 428/131; 428/138; 428/192

[58] Field of Search .......... 428/43, 41, 77, 428/78, 131, 79, 81, 138, 192, 40; 283/105; 281/5

[56] References Cited

U.S. PATENT DOCUMENTS

| | | | |
|---|---|---|---|
| 3,006,793 | 10/1961 | Wheeler | 154/53.5 |
| 3,038,957 | 5/1962 | Morgan | 154/53.5 |
| 3,547,752 | 12/1970 | Janssen | 428/43 |
| 3,859,157 | 1/1975 | Morgan | 156/268 |
| 3,864,200 | 2/1975 | Marshall | 161/135 |
| 3,900,645 | 8/1975 | Morgan | 428/41 |
| 3,950,580 | 4/1976 | Boudet | 428/41 |
| 4,051,285 | 9/1977 | Kramer | 428/192 |
| 4,265,412 | 5/1981 | Janas | 271/19 |
| 4,447,481 | 5/1984 | Holmberg et al. | 428/40 |
| 4,528,056 | 7/1985 | Hunt et al. | 156/253 |
| 4,615,929 | 10/1986 | Alexander | 428/43 |
| 4,687,696 | 8/1987 | Satoji | 428/192 |
| 4,704,317 | 11/1987 | Hickenbotham et al. | 428/156 |
| 4,765,654 | 8/1988 | Nakamura | 283/67 |
| 4,873,135 | 10/1989 | Witnebel et al. | 428/192 |
| 4,946,728 | 8/1990 | Ikeda et al. | 428/40 |
| 5,240,755 | 8/1993 | Zimmer | 428/40 |

FOREIGN PATENT DOCUMENTS

| | | |
|---|---|---|
| 0255396 | 3/1988 | European Pat. Off. . |
| 1800792 | 10/1968 | Germany . |
| 3434383A1 | 9/1984 | Germany . |
| 1211602 | 11/1970 | United Kingdom . |

*Primary Examiner*—Nasser Ahmad
*Attorney, Agent, or Firm*—Poms, Smith, Lande & Rose Professional Corporation

[57] ABSTRACT

Sheetstock including a relatively thin portion on at least one of the longitudinal edges for facilitating use of the sheetstock in an ink jet or laser printer. The relatively thin portion may be easily removed after printing. Also, the sheetstock may be divided into a number of portions which may be easily separated from one another after printing.

20 Claims, 1 Drawing Sheet

SHEETSTOCK ADAPTED FOR USE WITH LASER AND INK JET PRINTERS

BACKGROUND OF THE INVENTION

1. Field of Invention

The present invention relates generally to relatively thick sheetstock (or cardstock) and, more particularly, to sheetstock which is adapted to be fed into laser or ink jet printer and copying machines.

2. Background and Description of the Related Art

Ink jet and laser printers and copying machines are normally equipped with automatic paper feeders that remove individual sheets from a tray and feed them into the printer. Heavy sheetstock (or cardstock), which is relatively inflexible, cannot be fed into ink jet and laser printers using common automatic paper feeders. Accordingly, printing jobs which require heavy sheetstock, such as business cards, party invitations and promotional Rolodex™-type card file cards (which businesses give to their customers) must be taken to a print shop. This is both expensive and time consuming.

One proposed solution to this problem in the art is disclosed in U.S. Pat. No. 4,704,317 to Hickenbotham et al. The '317 patent discloses a method of modifying relatively thick sheetstock. The method entails reducing the stiffness of adjacent corners by scoring, slitting, die cutting or calendaring. However, this product has not come into general commercial use, presumably as a result of the additional manufacturing costs and other problems relating to the product. Further, the sheetstock disclosed in the '317 patent must be cut to the appropriate size after printing when used for the production of items, like business cards, which are smaller than the sheet itself.

SUMMARY OF THE INVENTION

The general object of the present invention is to provide improved sheetstock which obviates, for practical purposes, the aforementioned problems in the art. More particularly, one object of the present invention is to provide relatively heavy sheetstock which is adapted to be fed into laser and ink jet printers. Another object of the present invention is to provide sheetstock which may be easily used to produce business cards, party invitations and Rolodex™-type card file cards.

In order to accomplish these and other objectives, sheetstock in accordance with one aspect of the present invention includes first and second sheets combined to form a composite sheet in which a portion of a longitudinal edge of the first sheet extends longitudinally beyond a corresponding longitudinal edge of the second sheet, and longitudinal edge separating means, associated with at least one of the first and second sheets, for facilitating removal of the longitudinal edge of the second sheet. This aspect of the present invention provides a number of advantages over the prior art. For example, once manufactured, the composite sheet is ready for use in an ink jet or laser printer. Additional steps such as scoring and calendaring are not required. After printing, the longitudinal edge may be easily removed by hand. The use of a paper cutter after printing is not necessary.

In one preferred embodiment, the first sheet is composed of a relatively thin, flexible, high quality sheet upon which printing will take place. The second sheet may be composed of relatively thick, inexpensive stock. In another preferred embodiment, the first sheet is composed of a relatively thin strip. The second sheet is composed of a relatively thick, stiff, high quality sheet.

In accordance with another aspect of the present invention, card separating means for facilitating separation of the composite sheet into a plurality of individual cards may be provided. This aspect of the present invention enables a user to easily print a number of printed cards, such as business cards or party invitations, on a single sheet using an ink jet or laser printer. As such, printing jobs on heavy sheetstock, which normally must be taken to a professional printer, may be performed in the home or office. This aspect of the present invention will save users considerable amounts of time and money. Additionally, the card separating means may be advantageously composed of micro-perforations which provide smooth edges after separation.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

Figures 1, 2, 3, 4, 5:
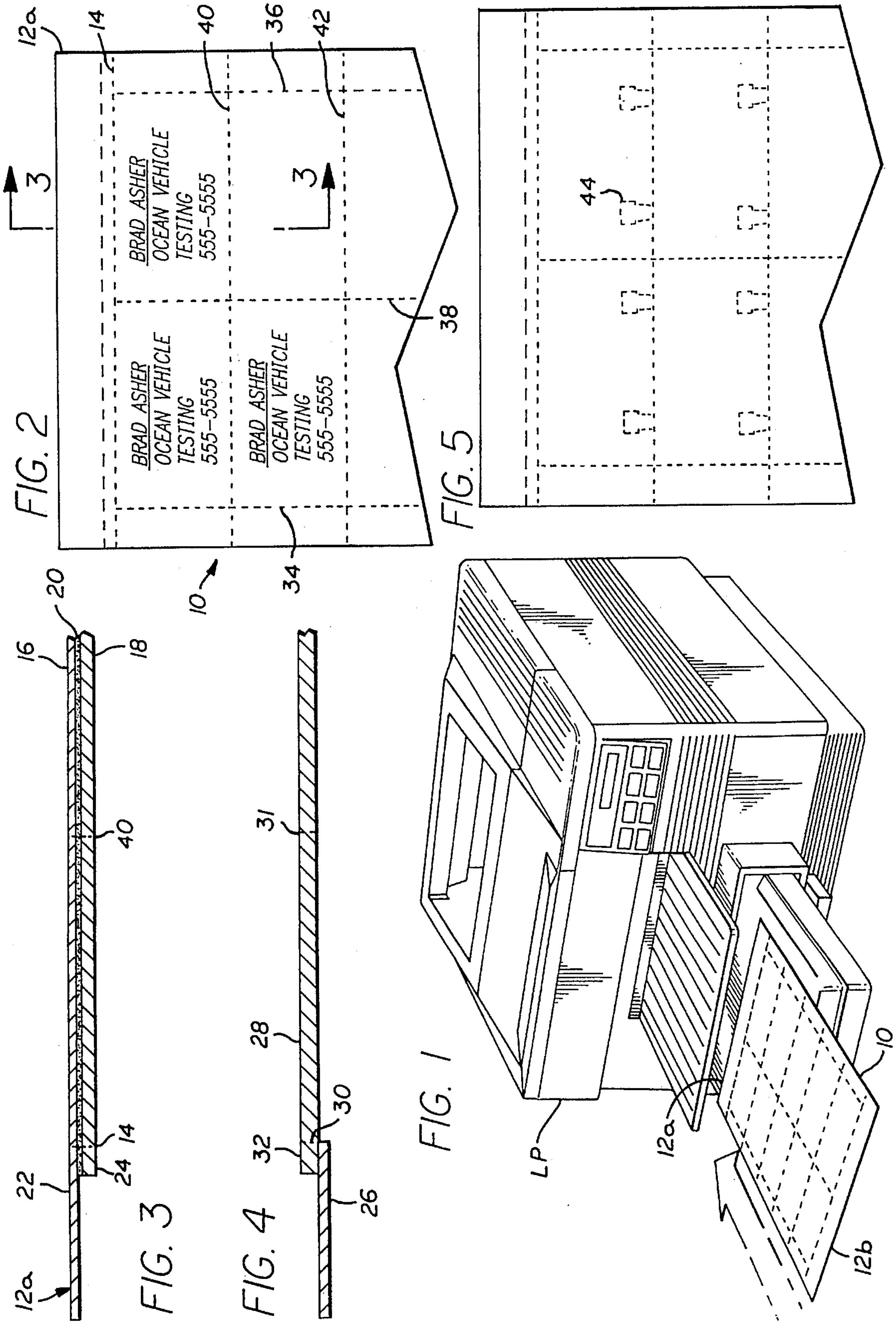
FIG. 1 is a perspective view of sheetstock illustrating the principles of the present invention being fed into a laser printer.
FIG. 2 is a plan view in accordance with a first preferred embodiment of the present invention.
FIG. 3 is a cross-sectional view taken along line 3—3 in FIG. 2.
FIG. 4 is a section view in accordance with a second preferred embodiment of the present invention.
FIG. 5 is a plan view in accordance with a third preferred embodiment of the present invention.

The following is a detailed description of the best presently known mode of carrying out the invention. This description is not to be taken in a limiting sense, but is made merely for the purpose of illustrating the general principles of the invention. The scope of the invention is defined by the appended claims.

In FIG. 1, a sheet 10 is shown in conjunction with a laser printer LP. In accordance with the present invention, the sheet 10 includes a relatively thin longitudinal edge **12*a* which is flexible enough to be fed into the laser printer LP. The sheet 10 may also include a second relatively thin longitudinal edge 12*b*** so that the sheet may be fed into a printer regardless of which edge is the "leading edge."

As illustrated for example in FIG. 2, the sheet 10 may include longitudinal edge separating means to facilitate removal of the longitudinal edge **12*a*. In accordance with a first preferred embodiment, the separation means is a perforation line 14. The perforation line 14 may be advantageously composed of micro-perforations (from approximately 50 to more than 100 perforations per inch) which will be relatively unnoticeable once the longitudinal edge 12*a* of the sheet 10** is removed.

The sheet 10 may be a composite sheet, such as that illustrated in FIG. 3, which includes a first sheet 16 attached to a second sheet 18 by an adhesive layer 20. In one preferred embodiment, a longitudinal edge 22 of the first sheet 16 extends beyond a corresponding longitudinal edge 24 of the second sheet 18, thereby forming the relatively thin longitudinal edge 12*a* of the sheet 10. The first sheet 16 may extend approximately ⅜" beyond the second sheet 18 at each end and should be composed of relatively thin (approximately 3–4 mils), flexible stock to facilitate the lifting of sheet 10 from a feeder tray in a printer.

As the first sheet 16 is the sheet onto which printing will take place, it may be advantageously composed of stock such as high quality paper, paper with a foil appearance, embossed paper, temperature resistant plastic and metalized or non-metalized film, depending upon customer preference. More specifically, the first sheet 16 may be composed of one of following ink jet papers:

Chartham Papers Computa Plot Opaque 90
Chartham Papers Computa Jet Premium
Finch Pruyen Ink Jet Paper
Hewlett Packard Coated Ink Jet Paper
InkJet Technology Ink Jet Paper
Kanzaki 24# White Coated Ink Jet paper
Nationwide Bright 96 Ink Jet Paper
Rexham Graphics 90# White
Schoeller IJ-01 Ink Jet Paper
Southwarth 25% Cotton 24# White Bond
Springhill 6# Index Plus
Strathmore 28# Ultimate White Wove Text Alternatively, the top sheet 16 may be composed of one of the following films and coated films:

Kimberly Clark Duraform Smudgeproof Saturated 60# Laser Shelf label
Arkwrite 749-00-02 Glossy Ink Jet Film
Camvac International 2.0 Mil Metalized Polyester
Web Technologies 2.0 Mil Adherable Brushed Metallic
Alcan Aluminum Dull Gold, Bright Gold, Dull Silver, or Bright Silver Paper Backed Foil
Rigid or semi-rigid vinyl
Clear or Matte Polyester The second sheet 18 is generally composed of relatively thick, inexpensive (approximately 6–8 mils) card stock or paper to provide the desired rigidity. Accordingly, the total thickness of the sheet 10 will preferably be approximately 10–12 mils, the thickness of a standard business card. Preferred examples of materials that may be used for the second sheet 18 are listed below in Table 1.

TABLE 1

| Material Description | Caliper (Mils) | Stiffness MD/CD |
|---|---|---|
| Balboa Plus 80# White Gloss Cover | 7.3 | 27.1/19.9 |
| Hammermill 100# Offset Opaque | 7.5 | 13.2/10.1 |
| Simpson Mustang 70# White Vellum Recycled | 6.4 | N/A |
| Simpson 100# White Tag | 7.0 | 11.7/6.5 |
| Simpson 90# White Index | 7.1 | 19.8/9.1 |
| Simpson 105# 7 Pt. Sequoia Matte | 7.2 | 20.9/13.2 |
| Simpson 75# White Return Post Card | 7.4 | 15.3/7.8 |
| Simpson Mustang 77# 7 Pt. White Post Card | 7.6 | N/A |
| Simpson 100# White Tag | 7.8 | 23.3/11.8 |
| Springhill 90# White Smooth Index | 7.3 | 15.9/10.9 |
| Springhill 100# White Smooth Tag | 7.3 | 24.4/11.5 |
| Wausau 100# Exact Tag | 7.5 | 17.9/9.4 |

A composite sheet in accordance with another preferred embodiment (illustrated in FIG. 4), includes a first sheet 26 in the form of a strip which is attached to a second sheet 28. A perforation line 30 enables removal of the entire first sheet 26 and a corresponding longitudinal edge 32 of the second sheet 28 after printing. A laterally extending perforation line 31 is also visible in FIG. 4. The first sheet 26 is composed of a relatively thin (approximately 1–5 mils), flexible stock. The second sheet 28 is composed of relatively thick (approximately 8–10 mils), stiff, high quality stock.

The sheet 10 may be used for a variety of purposes. One such purpose is the production of business cards. Referring to FIG. 2, the addition of a plurality of perforation lines 34–42 results in the formation of a plurality of substantially rectangular portions. Standard business card information, such as name, title and telephone number may be printed on each rectangular portion. The rectangular portions may then be separated with the aid of the perforation lines.

Similarly, additional perforations 44, such as those illustrated in FIG. 5, may be added to facilitate the use of the cards in Rolodex™-type card files. The perforation design is not limited to the illustrated embodiments. Other varieties of perforation shapes may be employed depending on the type of printing job for which the sheet will be used.

One method of manufacturing the sheet 10 includes the steps of laminating the first and second sheets together on a web press having dual web capability. In order to produce an 8½"×11" sheet in accordance with the preferred embodiment shown in FIG. 3, a first web (corresponding to the first sheet) approximately 11" wide is laminated to a second web (corresponding to the second sheet) approximately 10¼" wide. An automatic web guiding system may be used to center the second web on the first web, thereby producing the ⅜" extension on either side. Adhesive is applied to the full width of the second web to insure that no loose edges will be formed. Perforation lines may then be added as desired.

Although the present invention has been described in terms of the preferred embodiments above, numerous modifications and/or additions to the above-described preferred embodiments would be readily apparent to one skilled in the art. For example, the composite sheet could be subjected to die cutting or scoring in order to replace some or all of the perforation lines. Further, the present invention is applicable to laminated sheet assemblies such as index sheets wherein the total thickness of the laminated assemblies is 10–12 mils or greater so that it will not readily feed through a laser or ink jet printer or xerographic copier, but a basic underlying sheet of the assembly is provided with a free longitudinal edge which is relatively thin so it will easily feed. It is intended that the scope of the present invention extends to all such modifications and/or additions and that the scope of the present invention is limited solely by the claims set forth below.

What is claimed is:

1. Sheetstock, comprising:

first and second sheets laminated to one another, each of the first and second sheets defining respective thicknesses, side edges and longitudinal edges, the thickness of the first sheet being less than the thickness of the second sheet, the first and second sheets being combined to form a composite sheet in which a portion of each longitudinal edge of the first sheet extends longitudinally beyond a corresponding longitudinal edge of the second sheet;

perforation lines formed in at least the second sheet adjacent each of the longitudinal edges of the second sheet;

a plurality of perforation lines formed in at least the second sheet at longitudinal intervals between the perforation lines formed adjacent the longitudinal edges;

longitudinal perforation lines formed in at least the second sheet adjacent to each of the side edges of the second sheet; and a longitudinal perforation line formed in at least the second sheet substantially equidistant between the perforation lines adjacent to each side edge of the second sheet;

wherein the perforation lines divide the composite sheet into a plurality of substantially rectangular, readily separable cards, and wherein said sheetstock will feed through a laser or ink jet printer or photocopier.

2. Sheetstock, comprising:

first and second sheets, each of the first and second sheets defining respective lengths, longitudinal edges and side edges, the first and second sheets being laminated to one another to form a composite sheet in which a portion of at least one longitudinal edge of the first sheet extends longitudinally beyond a corresponding longitudinal edge of the second sheet, the portion of the first sheet defining a length which is less than the length of the second sheet; and longitudinal edge separating means, associated with at least one of the first and second sheets, for facilitating removal of the at least one longitudinal edge of the second sheet from the second sheet, wherein said sheetstock will feed through a laser or ink jet printer or photocopier.

3. The sheetstock claimed in claim 2, wherein a portion of both longitudinal edges of the first sheet extends longitudinally beyond the corresponding longitudinal edge of the second sheet.

4. The sheetstock claimed in claim 2, wherein the longitudinal edge separating means comprises a perforation line, composed of micro-perforations, formed in at least one of the first and second sheets.

5. The sheetstock claimed in claim 4, wherein the longitudinal edge separating means comprise a perforation line formed in each of the first and second sheets adjacent respective longitudinal edges of the first and second sheets.

6. The sheetstock claimed in claim 2, wherein the longitudinal edge separating means comprises a perforation line formed in the second sheet and the first sheet comprises a strip arranged between the perforation line and the corresponding longitudinal edge of the second sheet.

7. The sheetstock claimed in claim 2, further comprising:

side edge separating means, associated with the side edges of the first and second sheets, for facilitating removal of the side edges.

8. The sheetstock claimed in claim 7, wherein the side edge separating means comprises perforation lines formed in the composite sheet adjacent to the respective side edges of the first and second sheets.

9. The sheetstock claimed in claim 2, further comprising:

card separating means for facilitating separation of the composite sheet into a plurality of individual cards.

10. The sheetstock claimed in claim 9, wherein the card separating means comprises a plurality of longitudinally spaced perforation lines formed in the composite sheet.

11. The sheetstock claimed in claim 10, wherein the card separating means further comprises a longitudinally extending perforation line formed in the composite sheet substantially equidistant from the respective side edges of the second sheet.

12. The sheetstock claimed in claim 2, wherein the first and second sheets define respective thicknesses, the second sheet being substantially thicker than the first sheet.

13. The sheetstock claimed in claim 2, wherein the longitudinal edge of the first sheet extends approximately 3/8" beyond the corresponding longitudinal edge of the second sheet.

14. The sheetstock claimed in claim 2, wherein the composite sheet defines a thickness substantially between approximately 10 mils and approximately 12 mils.

15. A sheetstock assembly comprising:

a first sheet defining a first surface area;

a second member of sheet material, defining a second surface area that is less than the first surface area, secured to said first sheet to form a laminated assembly, the thickness of said laminated assembly being such that a full sheet of said laminated assembly does not feed through a laser or ink jet printer or a photo copier;

wherein said first sheet is relatively thin and has at least one longitudinal edge free of said second member, to facilitate feeding through printers and copiers.

16. A sheetstock assembly as defined in claim 15 wherein the thickness of the laminated assembly is at least 10 mils.

17. The sheetstock claimed in claim 2, wherein the longitudinal edges of the first sheet define a first dimension therebetween, the side edges of the first sheet define a second dimension therebetween and the first dimension is substantially greater than the second dimension.

18. The sheetstock claimed in claim 17, wherein the first dimension is substantially equal to approximately 11 inches and the second dimension is substantially equal to approximately 8½ inches.

19. The sheetstock claimed in claim 2, wherein the longitudinal edge separating means are located such that the composite sheet will define a substantially uniform thickness after the at least one longitudinal edge of the second sheet has been removed.

20. A sheetstock assembly comprising:

a first sheet; and a second sheet secured to the first sheet to form a laminated assembly defining a leading section and a main section, the main section defining a thickness such that the main section does not feed through a laser or ink jet printer or a photo copier upon being fed directly into the printers or copier, at least a portion of the leading section being relatively thin and having at least one longitudinal edge free of the main section to facilitate feeding of the assembly through the printers or copier, the leading section being removably secured to the main section in such a manner that when the leading section is separated from the assembly the portion of the assembly including the main section will define a substantially uniform thickness.

* * * * *